United States Patent
Edalati

(10) Patent No.: US 10,513,435 B2
(45) Date of Patent: *Dec. 24, 2019

(54) SYSTEMS AND METHODS FOR CONTROLLING ON-BOARD GENERATION AND USE OF HYDROGEN FUEL MIXTURES

(71) Applicant: NKE H2 Engines LLC, Bellevue, WA (US)

(72) Inventor: Nick K. Edalati, Bellevue, WA (US)

(73) Assignee: NKE H2 Engines LLC, Bellevue, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/295,900

(22) Filed: Oct. 17, 2016

(65) Prior Publication Data

US 2017/0096334 A1    Apr. 6, 2017

Related U.S. Application Data

(63) Continuation of application No. 14/477,727, filed on Sep. 4, 2014, now Pat. No. 9,469,536.
(Continued)

(51) Int. Cl.
*C01B 3/36* (2006.01)
*C01B 3/48* (2006.01)
(Continued)

(52) U.S. Cl.
CPC ............... *C01B 3/36* (2013.01); *B01J 8/001* (2013.01); *B01J 8/062* (2013.01); *C01B 3/382* (2013.01);
(Continued)

(58) Field of Classification Search
CPC ....... C01B 3/48; C01B 3/36; C01B 2203/148; C01B 2203/169; C01B 3/382; C01B 2203/1241; C01B 2203/0238; C01B 2203/0283; C01B 2203/0233; C01B 2203/1614; C01B 2203/142; C01B 2203/141; C01B 2203/025;
(Continued)

(56) References Cited

U.S. PATENT DOCUMENTS 4,476,683 A * 10/1984 Shah ...................... F01K 3/185
                                                    423/655
5,787,864 A *  8/1998 Collier, Jr. ......... F02M 21/0215
                                                    123/436
(Continued)

*Primary Examiner* — Amber R Orlando
*Assistant Examiner* — Syed T Iqbal
(74) *Attorney, Agent, or Firm* — Seed IP Law Group LLP

(57) ABSTRACT

This is a system for generating hydrogen on-board the vehicle from compressed natural gas (CNG) in select ratios to create hydrogen-enriched CNG (HCNG) fuel for use in internal combustion engines. The on-board generation of hydrogen is comprised of a reforming system of CNG fuel with direct contact with exhaust gases. The reforming system controls for production of HCNG fuel mixtures is based on specific engine operating conditions. The vehicle's engine controls and operating parameters are modified for combustion of selective ratios of HCNG fuel mixtures throughout engine operating cycle. The reforming system controls and engine controls modifications are also used to minimize combustion emissions and optimize engine performance.

4 Claims, 6 Drawing Sheets

Related U.S. Application Data

(60) Provisional application No. 61/873,491, filed on Sep. 4, 2013.

(51) Int. Cl.
  *C01B 3/38* (2006.01)
  *B01J 8/06* (2006.01)
  *B01J 8/00* (2006.01)

(52) U.S. Cl.
  CPC ....... *C01B 3/48* (2013.01); *B01J 2208/00504* (2013.01); *B01J 2208/00548* (2013.01); *B01J 2208/00628* (2013.01); *B01J 2219/0004* (2013.01); *B01J 2219/00038* (2013.01); *B01J 2219/00202* (2013.01); *B01J 2219/00211* (2013.01); *B01J 2219/00229* (2013.01); *C01B 2203/025* (2013.01); *C01B 2203/0233* (2013.01); *C01B 2203/0238* (2013.01); *C01B 2203/0283* (2013.01); *C01B 2203/0288* (2013.01); *C01B 2203/1241* (2013.01); *C01B 2203/141* (2013.01); *C01B 2203/142* (2013.01); *C01B 2203/148* (2013.01); *C01B 2203/169* (2013.01); *C01B 2203/1614* (2013.01); *Y02P 20/142* (2015.11)

(58) Field of Classification Search
  CPC ..... C01B 2203/0288; B01J 2219/00229; B01J 2219/00038; B01J 2219/00202; B01J 8/062; B01J 2208/00628; B01J 2208/00504; B01J 2219/0004; B01J 8/001; B01J 2219/00211; B01J 2208/00548; Y02P 20/142
  See application file for complete search history.

(56) References Cited

U.S. PATENT DOCUMENTS

| | | | |
|---|---|---|---|
| 6,508,209 B1* | 1/2003 | Collier, Jr. | F02B 43/00 123/3 |
| 2015/0073188 A1* | 3/2015 | Floudas | C10G 29/205 585/332 |

\* cited by examiner (Background)

(Background)

SYSTEMS AND METHODS FOR CONTROLLING ON-BOARD GENERATION AND USE OF HYDROGEN FUEL MIXTURES

PRIORITY DATA

The present application is a continuation of U.S. Pat. No. 14/477,727, filed Sep. 4, 2014, which is based on and claims the benefit under 35 U.S.C. § 119 of U.S. Provisional Application No. 61/873,491, filed Sep. 4, 2013.

TECHNICAL FIELD

This invention relates generally to the on-board vehicle generation of hydrogen-enriched natural gas fuel for use as an alternative fuel, and particularly to integrated control systems for generation of hydrogen fuel mixtures and use in internal combustion engines.

BACKGROUND

Hydrogen-enriched Compressed Natural Gas (HCNG) is a clean alternative fuel that combines the advantages of natural gas and hydrogen fuels for motor vehicle engines. Hydrogen enrichment improves the low burning velocity and poor combustion stability of Natural Gas fueled engines. Natural Gas fuel has generated much interest as an alternative fuel due to its potential for low particulate and hydrocarbon emissions. HCNG fuels provide advantages over Natural Gas by increasing efficiencies, power output, and further reducing emission through engine controls modifications.

Hydrogen is the most abundant element in the universe and is considered by the scientific community as the ideal alternative fuel. However, the present lack of hydrogen infrastructure, including production, distribution, and storage, and the high capital cost of developing that infrastructure has made the widespread use of hydrogen fuel economically unfeasible.

An effective solution for overcoming the structural barriers to the use of HCNG fuel is the on-board generation of hydrogen in motor vehicles through a natural gas reforming system utilizing engine exhaust gases. The utility of this system overcomes the costs, inefficiencies, and safety hazards associated with the production, distribution, and storage of hydrogen fuels.

Natural gas expressed in mole fraction is typically 95% methane. Other components include less than 2% ethane, propane, and less than 1% inert gases such as carbon dioxide and nitrogen. Raw natural gas requires processing to remove impurities, including water, to meet industry specifications for marketable natural gas.

Hydrogen is produced by a number of different processes including water splitting, electrolysis, and separation from industrial waste streams. Hydrogen can also be produced through reforming natural gas. A reformer is a form of fuel processor that converts hydrocarbon fuels including methane, propane and natural gas into hydrogen. The majority of commercially available hydrogen is generated through steam-methane reforming. Typically, a multi-step process is used to produce a high purity hydrogen gas stream, which can be used for a variety of purposes including mixture with other gases to produce an alternative fuel.

The most common form of reforming employs the use of steam ($H_2O$) and a hydrocarbon fuel. The hydrocarbon fuel is reacted in a heated reaction tube containing steam ($H_2O$) and at least one other catalyst. The primary derived reaction in the steam reformer is an Equilibrium Reaction (I) as indicated:

$$CH_4 + H_2O \rightleftharpoons CO + 3H_2 \quad \text{(I)}$$

As Equilibrium Reaction (I) moves to the right 2 moles of gas are converted to 4 moles of gas. This causes the reaction to be highly endothermic (−198 kJ/mol) and demonstrates pressure sensitivity (Le Chatelier's Principle) as hydrogen production is enhanced at lower pressures.

All four of the substances in Equilibrium Reaction (I) exist in the reformer as a gas mixture with excess steam ($H_2O$). In addition to the primary products of CO and $H_2$, a secondary Equilibrium Reaction (II) occurs:

$$CO + H_2O \rightleftharpoons CO_2 + H_2 \quad \text{(II)}$$

Equilibrium Reaction (II) is the Water Gas Shift Reaction. The reformer contains five gases in varying concentrations according to the equilibrium constants for Reactions (I) and (II). These equilibrium constants are temperature sensitive (see FIG. 1).

A separate Shift Reactor operates at a lower temperature to enhance Equilibrium Reaction (II). The overall objective of the reforming and shift reactions is to maximize hydrogen production.

Four other gases are present in varying concentrations and are impurities that must be removed in order to produce high purity hydrogen ($H_2$). The passage of methane ($CH_4$) through the process without undergoing reaction is known as "methane slip". For most hydrogen applications methane slip and carbon monoxide (CO) are impurities that must be removed. Fuel cell hydrogen requires a level of purity that dictates additional steps to remove relatively inert methane ($CH_4$) and carbon dioxide ($CO_2$), and carbon monoxide (CO). Otherwise, hydrogen impurities degrade fuel cell performance and catalyst life. The gas stream exiting the shift reactor also contains water vapor ($H_2O$) which must be removed by a condenser before further purification measures are applied.

In order to make high purity hydrogen ($H_2$), a final pressure swing adsorption (PSA) process may be performed. The PSA process involves a high pressure adsorption of impurities from the hydrogen ($H_2$) onto a fixed bed of adsorbents. The impurities are subsequently desorbed at low pressure into an off-gas stream, thereby producing an extremely pure hydrogen gas ($H_2$). For example, product purities in excess of 99.999% ($H_2$) by volume percentage can be achieved. The off-gas stream, which includes carbon dioxide ($CO_2$), carbon monoxide (CO), methane ($CH_4$) plus small amounts of water vapor and hydrogen ($H_2$), is returned to the process as supplemental fuel.

A process for producing hydrogen through steam-methane reforming is shown in FIG. 2. In Step 1 a hydrogen-rich gas stream is produced by injecting methane ($CH_4$) and steam ($H_2O$) into a reformer where it is reacts in the presence of a catalyst.

Step 2 moves the hydrogen-rich gas stream through a shift reactor where carbon monoxide (CO) reacts with steam to produce additional hydrogen. Both Steps 1 and 2 are endothermic reactions requiring a heat source. Step 3 is a condensing step to remove most of the water vapor ($H_2O$) from the hydrogen-rich gas stream. Step 4 is compression step where the hydrogen-rich gas is compressed to a specified pressure. Step 5 is the PSA step to remove impurities from the hydrogen-rich gas stream. The impurities include carbon dioxide ($CO_2$), carbon monoxide (CO), methane ($CH_4$), and residual water vapor ($H_2O$) which, in addition to small quantities of hydrogen ($H_2$), are recycled back to the boiler and/or auxiliary burners (not shown). It is also general practice to recover waste heat throughout the process with various heat exchangers (not shown).

The traditional methods of producing high purity hydrogen gas has required significant capital investment in compressor and PSA columns as well as operating expenses to supply electric power for the compressor. The PSA apparatus is comprised of vessels and valves connected and separated through conduits that have been difficult to reduce in size.

SUMMARY

This disclosure is directed to a system and synchronized process for the on-board production of calibrated quantities of hydrogen for the enrichment of natural gas for use as an alternative fuel with reduced costs and increased energy efficiency relative to conventional hydrogen production systems. Unlike present processes this system's performance is not affected negatively by impurities in the hydrogen.

A system and a synchronized process are provided for integrating the production of selective ratios of Hydrogen-enriched CNG (HCNG) fuel on-board the vehicle through a reforming system and engine controls modifications for the use of HCNG fuel mixtures throughout the engine operating cycle. The reforming system is comprised of reformer controls and reforming processes to produce selective ratios of Hydrogen in HCNG. Engine parameter and controls modifications are to include excess air ratio for lean fuel combustion process and ignition timing adjustments to reduce emissions and increase engine efficiencies and power output.

The reforming system includes a reformer configured to react CNG with engine exhaust gas components to produce an impure hydrogen rich gas stream. The exhaust gas flows are controlled by the reforming system to be extracted after the exhaust manifold to supply the reformer with the required steam and temperatures for direct contact with CNG in the reforming process. The first process in the reforming system is a Partial Oxidation (POX) reforming of CNG with excess air present in the exhaust gas supply to the reforming system. This requirement is a function of the excess air ratio nature of combustion. The partial oxidation reaction occurs when a sub-stoichiometric fuel-air mixture is partially combusted in the reformer, creating a hydrogen-rich synthesis gas or syngas. The chemical reaction of POX for methane takes the following form:

$$CH_4 + \tfrac{1}{2}O_2 \rightarrow CO + 2H_2 \qquad (III)$$

The second step in the reforming process is the steam reforming of CNG fuel to produce 3 moles Hydrogen ($H_2$) for every one mole of methane supplied to the reformer. The reforming system controls monitor engine operating parameters to configure exhaust gas and CNG flows to the POX and steam reformers. The operating temperature of the steam reformer ranges from 700° C. to 800° C. with the required heat provided by exhaust gas temperatures and POX exothermic reactions.

The presence of carbon dioxide ($CO_2$) in exhaust gases at high temperatures provides an additional opportunity for a methane reforming process known as the "carbon dioxide reforming of methane." This process employs a different catalyst than is used in steam reforming. The chemical reaction is represented by:

$$CO_2 + CH_4 \rightarrow 2H_2 + 2CO \qquad (IV)$$

Additional Hydrogen can be recovered at lower temperatures through water gas shift reactions ($CO + H_2O \rightleftharpoons CO_2 + H_2$ Reaction II). At least one water gas shift reaction is required at 350° C. to maximize hydrogen generation and reduce carbon monoxide (CO) concentration to a few percentage points. A second water gas shift reaction at lower temperatures will further reduce carbon monoxide and produce more hydrogen.

After the reforming system produces hydrogen, the reformed gas stream is premixed with the CNG main fuel supply to produce a selective hydrogen ratio HCNG fuel for engine combustion. The ideal ratios of Hydrogen in HCNG fuel ranges from 20% to 30% (by weight) for optimal engine operation. Selective Hydrogen ratios are obtained from the reforming system controls by manipulating the CNG and exhaust gas flows to the reforming system, and controlling each stage in the reforming reactions generation of hydrogen gas.

The reforming system controls and engine control units are interactive to determine precise engine operating conditions with HCNG. Data transmission and communication between the two control systems provides the hydrogen ratios in HCNG and engine control parameters for optimized combustion. Efficiency gains of up to 31% are achievable with CNG reformation based on enthalpy gains through hydrogen generation. Emissions are reduced (up to 90% reduction in NOx emissions) when exhaust gas is used in direct contact reforming of CNG. Engine heat losses are employed to provide the temperatures necessary in the reforming system. The steam supply required for the reforming system is provided by the exhaust gas compounds, bypassing the need for a separate heated water supply. Carbon dioxide in the exhaust gases is used for further methane reforming and production of more Hydrogen, with an additional reduction of greenhouse gases.

Engine controls modifications include adjustments to air-fuel ratios and ignition timing. HCNG fuel mixtures require air-fuel ratio ranges between 1.3 and 1.8 for optimal combustion performance. The ignition timing adjustments along with air-fuel ratios are the main engine parameters contributing to both emission reductions and engine performance. These adjustments are based on engine operating conditions and the Hydrogen ratio in HCNG.

BRIEF DESCRIPTION OF THE DRAWINGS

Exemplary embodiments are illustrated in the referenced figures of the drawings. It is intended that the embodiments and the figures disclosed herein are to be considered illustrative rather than limiting.

DETAILED DESCRIPTION

The following definitions are used in the present disclosure.

CNG means compressed natural gas;

HCNG means Hydrogen-enriched compressed natural gas;

$CH_4$ is the chemical composition of methane, the main component of natural gas;

POX means Partial Oxidation process in methane reforming as described by reaction III;

Hydrogen Ratio in HCNG refers to weight and not volume.

Figure 1:
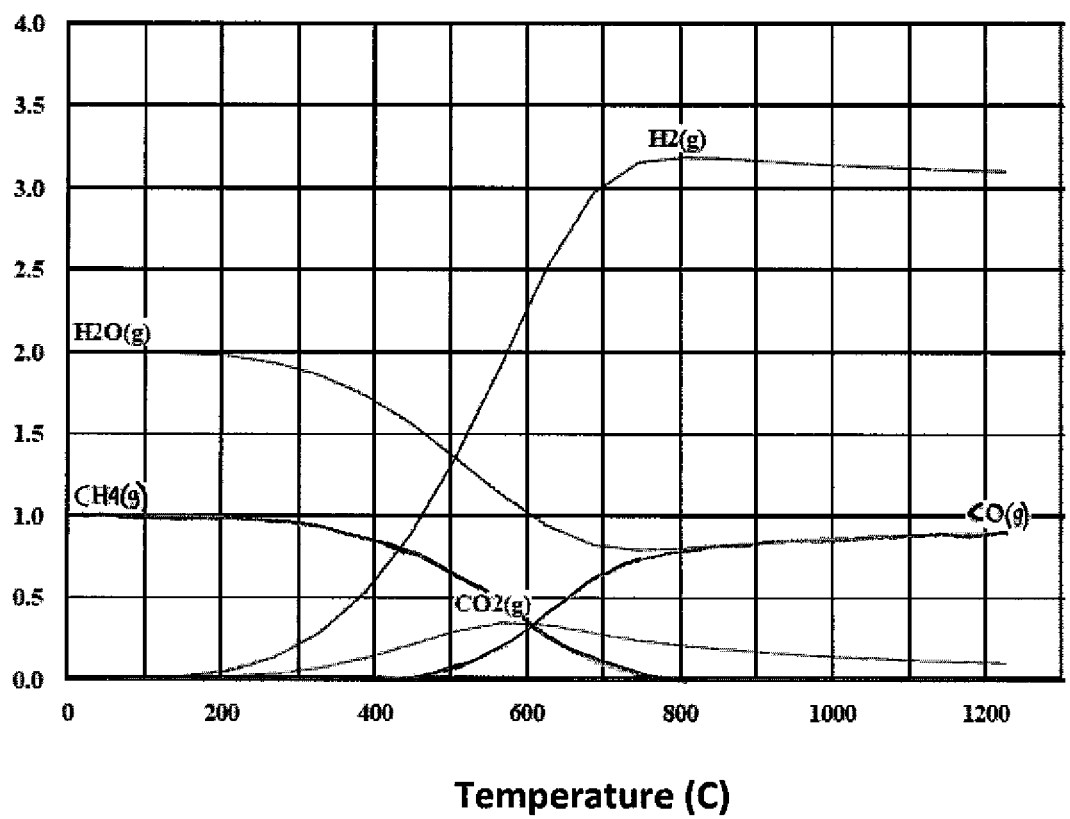
FIG. 1 is the equilibrium concentration graph for a steam methane reformer, illustrating the concentrations of $CH_4$, $CO_2$, CO, $H_2O$ and $H_2$ in moles versus temperature in degrees Celsius (C) and at initial conditions $CH_4$ is 1 mole for this illustration.
Figure 2:
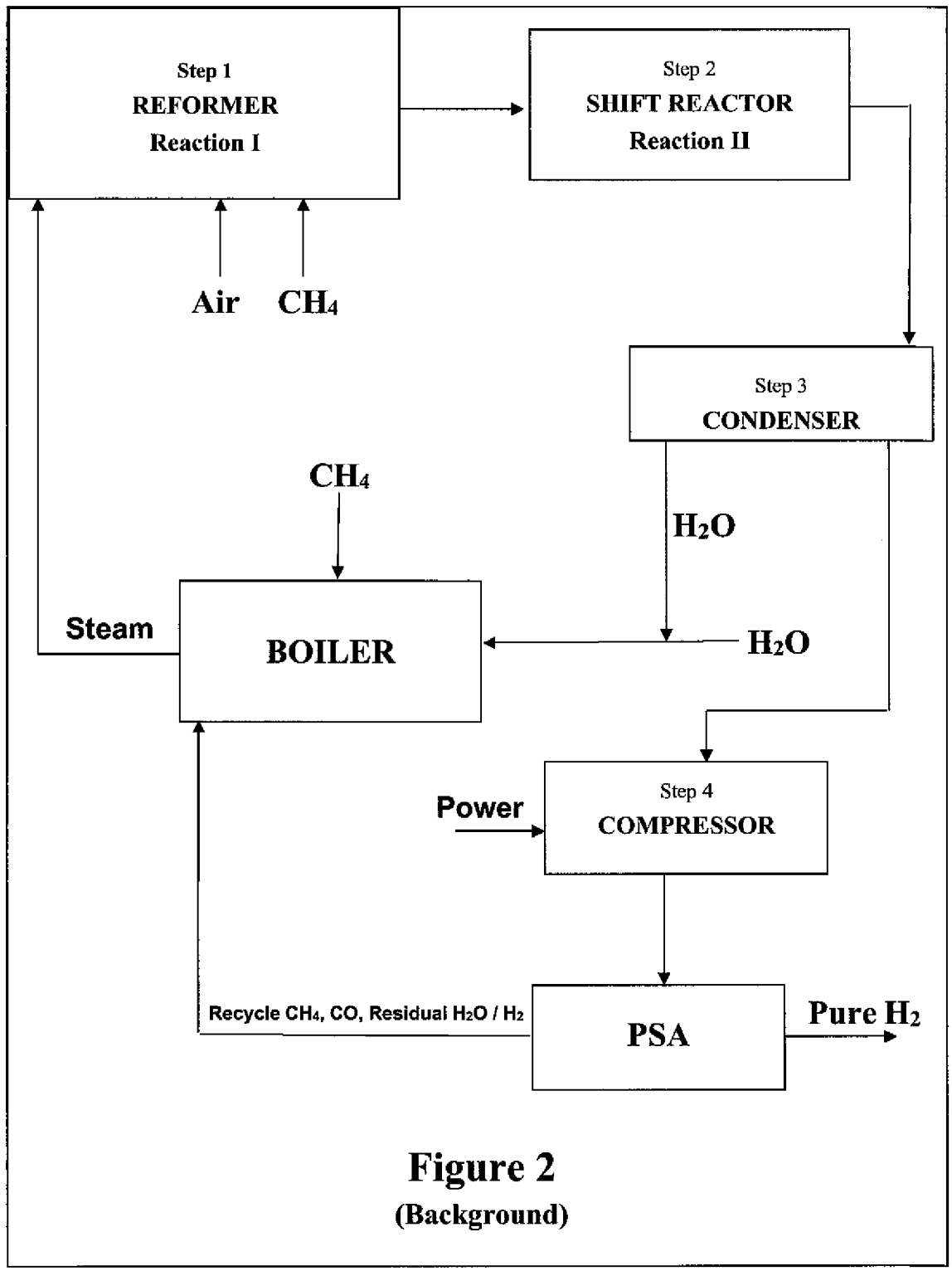
FIG. 2 is a block diagram of a process flow for steam-methane reforming in a prior art
Figure 3:
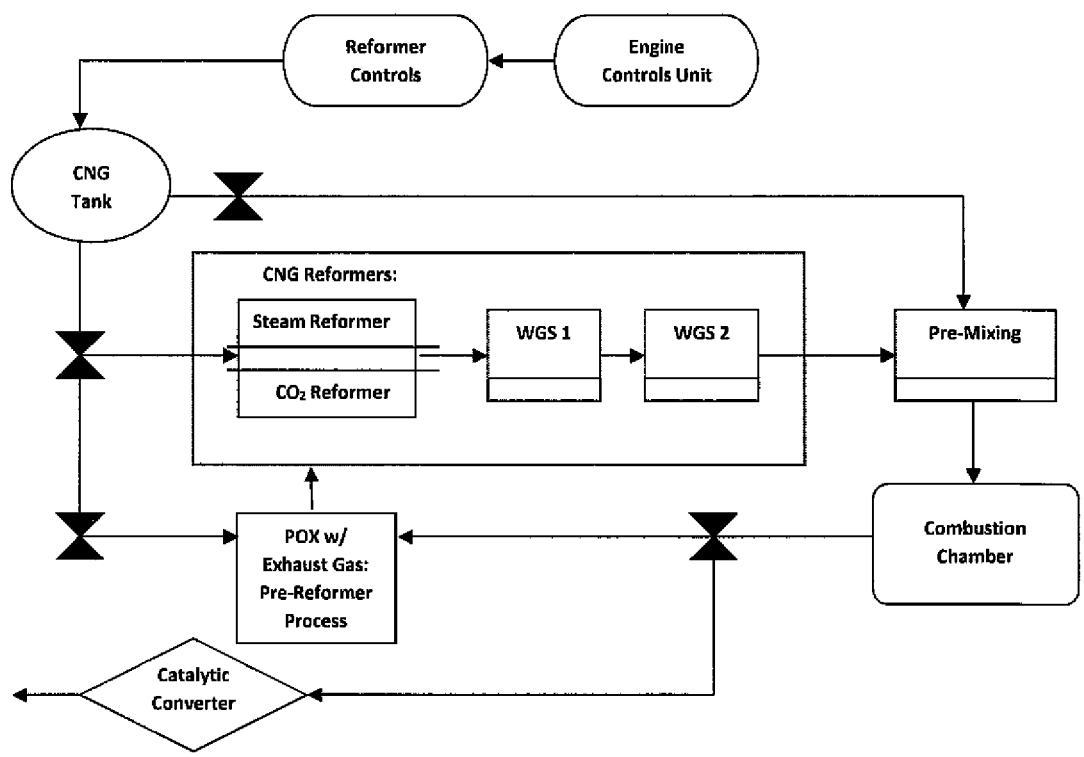
FIG. 3 is a schematic view of a system on-board a vehicle for producing HCNG

FIG. 3 is a schematic view of an on-board vehicle system for producing HCNG. Engine exhaust gases are used for the reforming process as most reactions in these systems are highly endothermic and require high temperatures for the conversion of $CH_4$ to hydrogen. CNG and HCNG combustion exhaust gases contain the water vapor or steam necessary for the reforming of methane which eliminates the need for dedicated water supply tanks and heat exchangers for steam production. Not only does this decrease vehicle weight and deliver energy cost savings, but the recirculation of exhaust gases through the reforming system further reduces engine emissions.

The first step in the on-board vehicle methane reforming process is POX reforming of CNG due to the excess air present in exhaust gases. HCNG requires excess air fuel ratios in the combustion process. POX reactions are exothermic and provide additional heat to the reforming system. The reforming controls system responds to engine operating conditions and inputs from the engine controls unit to determine the both the amount of exhaust gases to be extracted and the input quantity of methane for the POX reactions. The resulting POX reaction products are injected into the CNG reforming system. The CNG is reformed in both a steam reformer and a carbon dioxide reformer at high temperatures in presence of catalysts to generate a hydrogen-rich gas stream. Both reforming reactions are highly endothermic, requiring heat and high temperatures, which is supplied by POX exothermic reactions and exhaust gases. The hydrogen-rich gas stream is then treated in a Water Gas Shift reactor (WGS) with a catalyst to reduce carbon monoxide (CO) concentrations and generate additional hydrogen. A second WGS reactor may be implemented at lower temperatures to produce a more pure hydrogen gas stream. The next step is mixing the hydrogen-rich gas stream with CNG to generate HCNG fuel for engine combustion. The ratios of hydrogen in HCNG fuel are calibrated by the reforming system controls based on engine operating conditions. Also, engine controls unit modifications and adjustments are configured for HCNG fuel mixtures.

Figure 4:
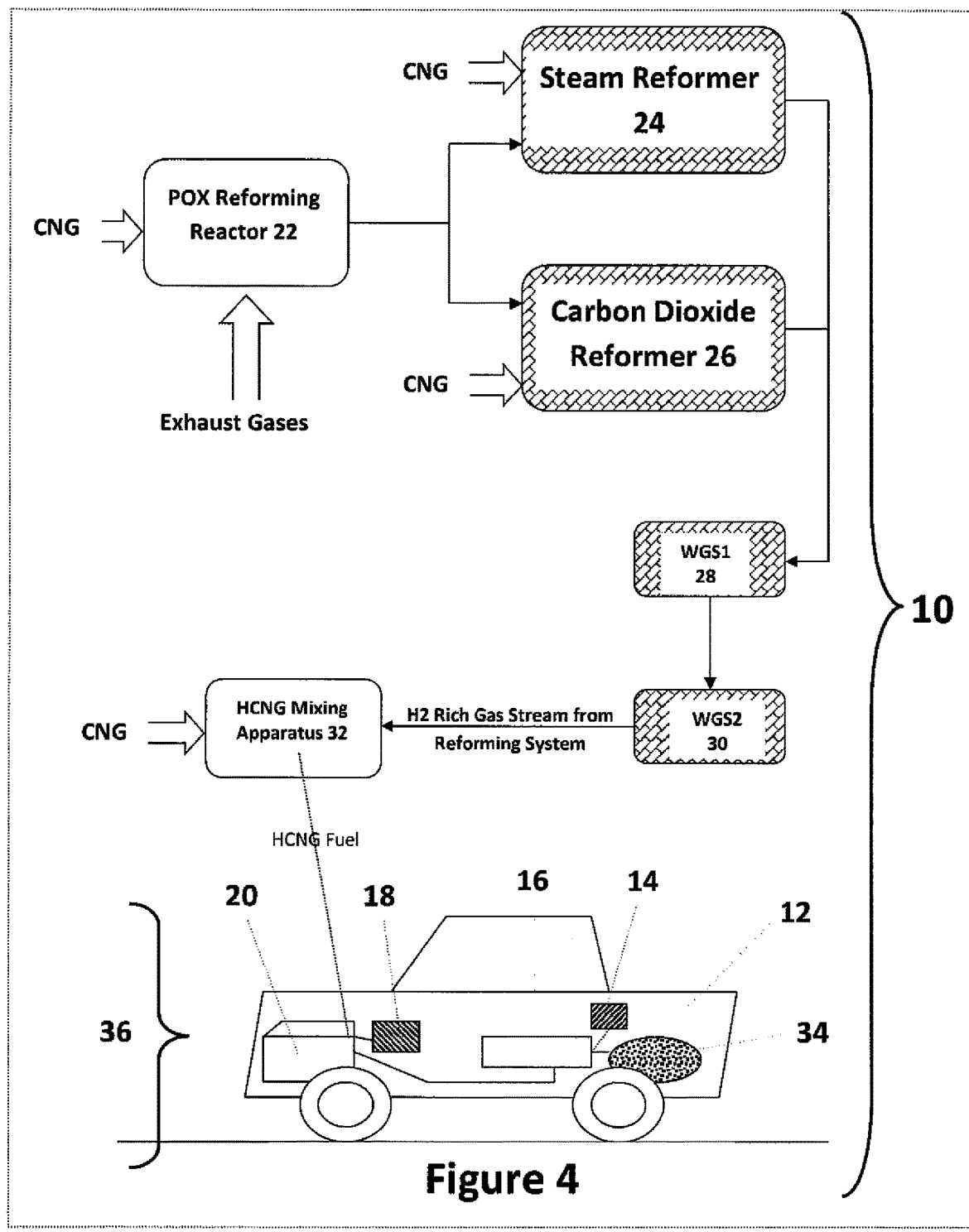
FIG. 4 is a block diagram illustrating a process flow in an on-board vehicle system for producing a hydrogen-enriched natural gas fuel

FIG. 4 illustrates a System (10) for the On-Board Vehicle production of HCNG as an alternative fuel according to one embodiment of the present invention. The following are the named processes or systems that are components of a System (10) as represented in FIG. 4:

12 Motor Vehicle
14 Reforming System Controls
16 Reforming System
18 Engine Controls Unit (ECU)
20 Vehicle Engine
22 POX Reforming Reactor
24 Steam Reformer
26 Carbon Dioxide Reformer
28 Water Gas Shift Reactor 1 (WGS1)
30 Water Gas Shift Reactor 2 (WGS2)
32 HCNG Mixing Apparatus
34 Vehicle Main CNG Fuel Tank
35 Process
36 Control Systems FIG. 4 depicts a System (10) that includes a Reforming System (16), Reforming Controls (14), and an ECU (18) on-board a Motor Vehicle (12). The Reforming System (16) may include the following components: POX Reactor (22), Steam Reformer (24), Carbon Dioxide Reformer (26), WGS1 (28), WGS2 (30). The Reforming System (16) produces a hydrogen-rich gas stream that is blended with CNG in a Mixing Apparatus (32) to produce an HCNG fuel supply for a Vehicle Engine (20). A Process (35) is the synchronized configuration of the Reforming System Controls (14) and ECU (18) for the operation of the Reforming System (12) and Vehicle Engine (20). Reforming System Controls (14) manage production of selective ratios of hydrogen in HCNG fuel based on engine operating conditions. The weight ratio of hydrogen in HCNG fuel can range from 20% to 30% depending on engine cycle requirements.

The Reforming System (16) is located on-board the Motor Vehicle (12) in FIG. 4. The Reforming System (16) produces a hydrogen-enriched gas stream by methane reforming in the following sequence of processes: POX Reforming Reactor (22), Steam Reformer (24), Carbon Dioxide Reformer (26), WGS1 (28), and WGS2 (30). The gas flow inputs to the Reforming System (16) are methane in the form of CNG from the Vehicle Main CNG Fuel Tank (34) and exhaust gases from the engine combustion process. The Reforming System (16) controls CNG flows and the amount of exhaust gas extracted for use in powering the vehicle 12. The calibrated extraction of exhaust gas supplies the required amounts of steam and carbon dioxide in methane Reformers (24) and (26). Prior to Reformers (24) and (26) the exhaust gases react with methane in the POX Reforming Reactor (22) based on the amount of excess air fuel ratio in the combustor process. The combustor operation with HCNG, in preferred embodiments, is best optimized for emissions and performance with excess air fuel ratios in the 1.3 to 1.8 range. To use exhaust gases in direct contact with methane in Reformers (24), (26), (28), and (30) the concentration of oxygen is minimized by POX Reforming Reactor (22) Reaction III:

$$CH_4 + \tfrac{1}{2}O_2 \rightarrow CO + 2H_2 \qquad \text{(III)}$$

Reaction III generates 2 moles of hydrogen for every 1 mole of $CH_4$ supplied to the POX Reforming Reactor (22). The data interchange between the ECU (18) and the Reforming System Controls (14) determines exhaust gas and CNG flows required for the POX Reforming Reactor (22) operation. The POX Reforming Reactor (22) operates in sub-stoichiometric conditions and supplies additional heat or energy input for endothermic reactions in Reformers (24), (26), (28), and (30). The hydrogen generation from the POX Reforming Reactor (22) contributes a smaller $H_2$ ratio to HCNG fuel; most of the hydrogen generated by the System (10) occurs in the other Reforming Reactions of components (24), (26), (28), and (30).

The Reforming System (16) depicted in FIG. 4 includes the Steam Reformer (24) configured to generate hydrogen through reaction of methane with water vapor as shown in Reaction I:

$$CH_4 + H_2O \rightarrow CO + 3H_2 \qquad \text{(I)}$$

Reactions in Steam Reformer (24) occur in the presence of catalysts, such as nickel-based catalysts, operating in a temperature range between 650° C. and 900° C. Water vapor in exhaust gases supply the steam required for the Steam Reformer (24). Direct contact of exhaust gases with methane in Steam Reformer (24) provides needed temperature, heat and energy for the reactions with the added benefit of not damaging the catalysts. The direct contact method construct also eliminates the need for installing a heat exchanger in the on-board System (10). The Steam Reformer (24) contains catalysts in reaction tubes to maximize contact of reactive gases with catalyst surfaces. The flow of both exhaust gases and CNG to the Steam Reformer (24) is monitored and controlled by the Reforming System Controls (14). Note that the catalysts are not limited to the aforementioned example and one skilled in the art will recognize this fact.

The Reforming System (16) depicted in FIG. 4 includes the Carbon Dioxide Reformer (26) configured to generate hydrogen through reaction of methane with carbon dioxide as shown in Reaction IV:

$$CO_2 + CH_4 \rightarrow 2H_2 + 2CO \quad (IV)$$

Reactions in Carbon Dioxide Reformer (26) occur in the presence of catalysts, such as rhodium and iron-based catalysts, operating in a temperature range between 700° C. to 800° C. (Note that the catalysts are not limited to the aforementioned example and one skilled in the art will recognize this fact.) Exhaust gases supply the $CO_2$ required for the Carbon Dioxide Reformer (26). Direct contact of exhaust gases with $CH_4$ in Carbon Dioxide Reformer (26) provides needed temperature, heat and energy for the reactions with the added benefit of not damaging the catalysts. This direct contact method also eliminates the need for installing a heat exchanger in the System (10). The Carbon Dioxide Reformer (26) contains catalysts in reaction tubes to maximize contact of reactive gases with catalyst surfaces. The flow of both exhaust gases and CNG to the Carbon Dioxide Reformer (26) is monitored and controlled by the Reforming System Controls (14).

Reactions I and IV demonstrate that 5 moles of hydrogen is generated for every 2 moles of $CH_4$ input to Reformers (24) and (26). Water Gas Shift reactions in WGS1 (28) and WGS2 (30) provide one additional mole of $H_2$ for hydrogen enrichment of CNG fuel as shown in Reaction II:

$$CO + H_2O \rightarrow CO_2 + H_2 \quad (II)$$

The WGS1 (28) operates between 350° C. and 420° C. and employs catalysts, such as iron oxide-based catalysts, to convert CO formed in Reactions I and IV to hydrogen. CO concentrations in the Reforming System (16) hydrogen-rich gas stream exiting WGS1 (28) are reduced to less than 4%. Note that the catalysts are not limited to the aforementioned example and one skilled in the art will recognize this fact.

The Reforming System (16) may employ a second WGS2 to further reduce CO concentrations in the gas stream. Because it operates at temperatures below 200° C., characterized by costly catalysts and slow reaction kinetics, WGS (30) should be used in systems requiring purer forms of hydrogen.

Fuel Cell applications require stringently pure hydrogen for operation. In the Prior Art, the removal of impurities from a hydrogen-rich gas stream requires a significant investment in capital assets, operating expense, high energy consumption. Unlike Fuel Cell systems, the impurities in HCNG fuel hydrogen do not have a negative effect on the operation or performance of the Vehicle Engine (20) in the System (10).

A hydrogen-rich gas stream from the Reforming System (16) is blended with CNG fuel in the HCNG Mixing Apparatus (32) to produce HCNG fuel for Vehicle Engine (20) combustion as shown in FIG. 4. Hydrogen for enrichment of CNG to create HCNG is generated by the System (10) on-demand at no additional cost to the Motor Vehicle (12) operator. This Just-in-Time process eliminates the cost and inefficiencies associated purchasing and storing hydrogen for use as a motor vehicle fuel both on-board the vehicle and upstream throughout the hydrogen fuel supply chain. Because hydrogen is generated on-demand in the System (10), Motor Vehicles (12) do not require the weight, space consumption, operating inefficiencies, and additional costs associated with existing hydrogen fuel systems.

Figure 5:
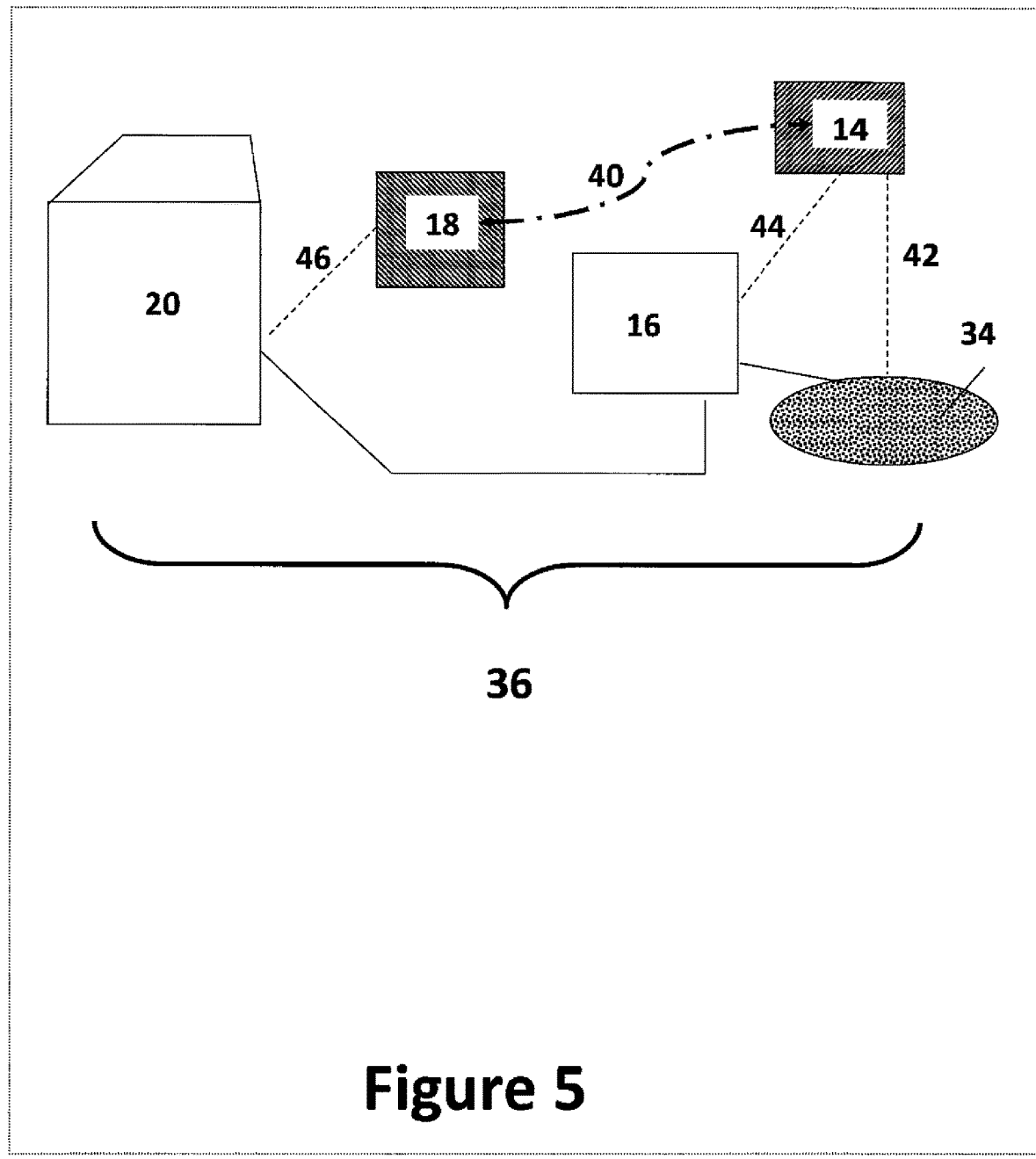
FIG. 5 is a block diagram illustrating the interaction and connectivity between the Reforming System Controls and Engine Controls Unit and the Reformers and Reactors of the System

The Control Systems (36) for the System 10) is depicted in FIG. 5. The Control Systems (36) consists of two control modules: the Reforming System Controls (14) and the Engine Controls Unit or ECU (18). The Reforming System Controls (14) monitor and manage the on-board vehicle generation of hydrogen by producing selective $H_2$ ratios in HCNG fuel mixtures for the System (10).

FIG. 5 illustrates how the Reforming System Controls (14) and ECU (18) are connected by Data Link (40) to ensure the synchronized operation of the Reforming System (16) and Vehicle Engine (20). The ECU (18) collects operational and parametric data from the Vehicle Engine (20) then transmits that data to the Reforming System Controls (14). This data exchange calibrates the amount of engine exhaust gases to be extracted for the Reforming System (16) operation. Reforming System Controls (14) manage the flow rates of CNG and exhaust gas to the Reforming System (16). The CNG flow rate to POX (22) is based on excess air in the exhaust gas composition. The ECU (18) communicates air-fuel ratio from the combustion process to the Reforming System Controls (14) to determine the CNG flow rate to POX (22) for reaction with oxygen.

The Reforming System Controls (14) determine the flow of CNG to Reformers (22), (24), and (26) to produce hydrogen in selective quantities. This is synchronized with the flow of exhaust gas to the Reforming System (16) to supply the correct amount of steam and $CO_2$ required for the generation of hydrogen. The ECU (18) transmits Vehicle Engine (20) operating data, including fuel flow rate and combustor efficiency, to the Reformer System Controls (14) which determines the specific amount of $H_2O$ and $CO_2$ in the Vehicle Engine (20) exhaust gas.

The Reforming System Controls (14) monitor and manage the flow rate of the hydrogen-rich gas stream and CNG to the Mixing Apparatus (32) to produce selective hydrogen ratios in HCNG fuel. The hydrogen ratios range from 20% to 30% of the HCNG fuel mixtures. The $H_2$ ratio is based on engine operating data for optimal performance and emission controls. The Reforming System Controls (14) communicates the $H_2$ ratio to the ECU (18) for setting combustor operating parameters.

The ECU (18) is configured for HCNG fuel to increase efficiency, power output and to reduce emissions in the Vehicle Engine (20). The ECU (18) monitors and manages Vehicle Engine (20) parameters for combustion process for HCNG fuel throughout the Vehicle Engine's (20) complete operating cycle. A principle advantage of HCNG fuel is combustion with excess air fuel ratios. The addition of hydrogen raises CNG's lean burn limit which reduces Vehicle Engine (20) emissions, especially NOx and CO , and decreases fuel consumption. The lean burn limit of HCNG is increased because of the faster burn speed, flame velocity, and laminar burn properties of hydrogen . The ECU (18) can vary the excess air fuel ratio from 1.3 to 1.8 based on the Vehicle Engine's (30) operating data and the HCNG fuel's $H_2$ ratio.

HCNG fuel combustion with excess air fuel ratios requires ECU (18) to adjust ignition timing parameters based on operating conditions and $H_2$ ratio. The ignition timing adjustments are optimized along with $H_2$ ratios and excess air fuel ratios to increase engine efficiency, power output and to reduce exhaust emissions. Ignition timing configuration in ECU (18) is significant to engine (20) operation with HCNG fuel in order to avoid engine knock and increased NOx emissions.

Figure 6:
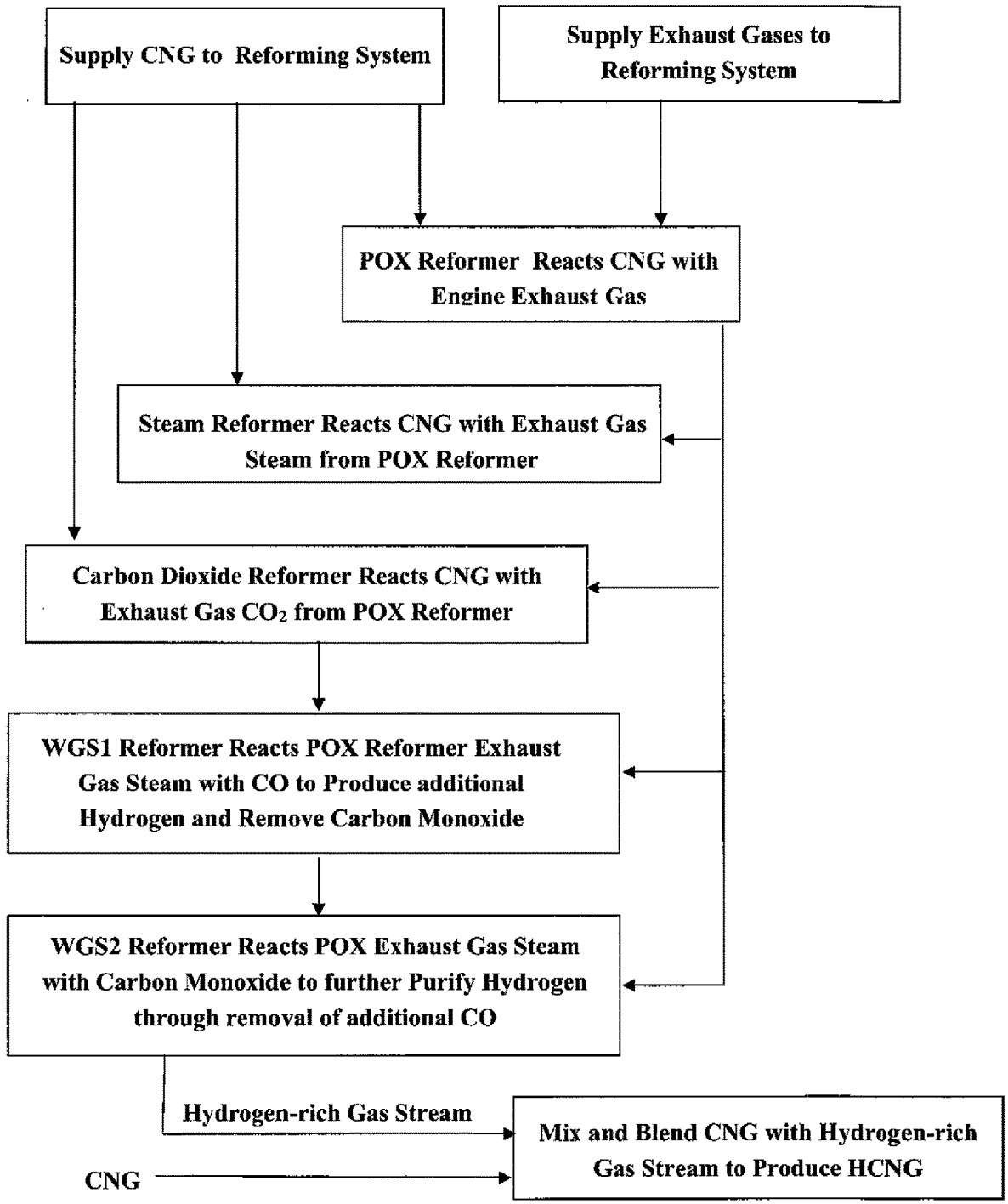
FIG. 6 is a block diagram illustrating steps in producing HCNG on-board a vehicle

FIG. 6 is a block diagram illustrating the steps of the System (10) for producing HCNG on-board a Motor Vehicle (12). These steps may vary depending on the application. For example, some applications may not require the WGS2 step which delivers a higher level of hydrogen purity.

The steps of the method in FIG. 6 include:

Supply Compressed Natural Gas (CNG) to the Reforming System (16) in FIG. 4;

Supply Vehicle Engine (20) exhaust gas to the Reforming System (16) in FIG. 4;

Reacting CNG with exhaust gas in the POX Reforming Reactor (22);

Reacting Steam from POX reaction products with CNG in a Steam Reformer (24) to produce a hydrogen-rich gas stream;

Reacting $CO_2$ from POX reaction products with CNG in a Carbon Dioxide Reformer (26) to produce a hydrogen-rich gas stream;

Reacting Steam from POX reaction products with hydrogen-rich gas streams in Water Gas Shift Reactor 1 (28) to remove carbon monoxide (CO) and produce additional hydrogen;

Reacting Steam from POX reaction products with hydrogen-rich gas streams in Water Gas Shift Reactor 2 (30) to further purify hydrogen;

Mixing and blending the hydrogen-rich gas stream with CNG in the HCNG Mixing Apparatus (32) to produce HCNG alternative fuel.

While the invention has been described with reference to certain preferred embodiments, as will be apparent to those skilled in the art, certain changes and modifications can be made without departing from the scope of the invention. Moreover, the foregoing examples of the related art and limitations related therewith are intended to be illustrative and not exclusive. Other limitations of the related art will become apparent to those of skill in the art upon a reading of the specification and a study of the drawings. Similarly, the embodiments of the present invention and aspects thereof are described and illustrated in conjunction with a system and synchronized process, which are meant to be exemplary and illustrative, not limiting in scope.

In the present disclosure, certain details are set forth in conjunction with the described embodiments of the present invention to provide a sufficient understanding of the invention. One skilled in the art will appreciate, however, that the invention may be practiced without these particular details.

Furthermore, one skilled in the art will appreciate that the example embodiments described do not limit the scope of the present invention, and will also understand that various modifications, equivalents, and combinations of the disclosed embodiments and components of such embodiments are within the scope of the present invention. Embodiments including fewer than all the components of any of the respective described embodiments may also be within the scope of the present invention although not expressly described in detail. Finally, the operation of well-known components and/or processes has not been shown or described in detail below to avoid unnecessarily obscuring the present invention.

What is claimed is:

1. An engine system, comprising:
    an on-board vehicle system configured to operate on-board a vehicle, the on-board vehicle system including:
        a combustion system configured to combust natural gas to generate energy and exhaust gas;
        a pre-reforming system configured to receive unreformed natural gas and coupled to the combustion system to receive at least a portion of the exhaust gas, the pre-reforming system configured to generate a partial oxidation reaction between the unreformed natural gas and the exhaust gas to generate partial oxidation reaction products;
        a reforming system including a steam reformer, a carbon dioxide reformer, and a first water-gas-shift reformer, the reforming system coupled to the pre-reforming system and configured to reform the partial oxidation reaction products to produce reformed natural gas;
        a mixing system coupled to the reforming system and configured to mix reformed natural gas and unreformed natural gas that is provided as the natural gas to the combustion system; and
        a reforming control system coupled to the pre-reforming system and configured to control the supply of the exhaust gas to the pre-forming system so the supplied exhaust gas has a first ratio with the unreformed natural gas based on a first operating condition and is configured to control the supply of the exhaust gas so the supplied exhaust gas has a second ratio with the unreformed natural gas based on a second operating condition.

2. The engine system of claim 1, wherein the reforming control system is further configured to control an amount of the unreformed natural gas delivered to the pre-reforming system as a ratio with the generated exhaust gas.

3. The engine system of claim 1 further comprising an engine control unit, and wherein the reforming system is integrated with the engine control unit.

4. The engine system of claim 3, wherein the reforming control system is configured to extract the exhaust gasses from the combustion system based on inputs from the engine control unit for required amounts of steam and carbon dioxide for generation of hydrogen.

\* \* \* \* \*